UNITED STATES PATENT OFFICE.

HENRY A. COOKE, OF FALL RIVER, MASSACHUSETTS.

IMPROVEMENT IN ARTIFICIAL STONE.

Specification forming part of Letters Patent No. 127,309, dated May 28, 1872.

*To all whom it may concern:*

Be it known that I, HENRY A. COOKE, of Fall River, in the county of Bristol and in the State of Massachusetts, have invented certain new and useful Improvements in Artificial Stone; and do hereby declare that the following is a full, clear, and exact description thereof.

The nature of my invention consists in the use of an aqueous solution of gum copal in the manufacture of artificial stone, concrete, &c., to be applied to the outside or inside of brick or wooden buildings and finished as stone; said aqueous solution of gum copal adhering, combining, and cementing together firmly the mineral substances of which such artificial stone, concrete, &c., are to be composed. It also consists in the process for producing the aqueous solution of gum copal, as will be hereinafter more fully set forth.

In order to enable others skilled in the art to which my invention appertains to make and use the same, I will now proceed to describe the manner in which the same is or may be made and used.

I take one part of English Portland cement and two parts of sand, gravel, silica, or other suitable material, and mix the same thoroughly together. This prepared mass or compound is moistened with my aqueous solution of gum copal, after which it is thoroughly and properly mixed by distributing the moisture to all the particles of said mass or compound. The thus-moistened mass is then placed in molds of any desired form, pattern, or style, and tamped with iron or wooden tamping-tools, being first tamped, beaten, or pounded into the corners, angles, or crevices, then the face or surface; then add concrete mass and tamp until the requisite amount is obtained; float off the surplus mass and finish up with a trowel. The mold being filled, it is now ready to be turned upon or onto the boards or plank prepared to receive it and laid aside for hardening, being frequently moistened with water to prevent too rapid drying.

These ingredients thus prepared may be tamped with my aqueous solution of gum copal by blow after blow with a suitable tamping-tool or by percussion, as may be desired.

These ingredients may also be affixed to walls of brick, stone, or wood. In applying to wood as mastic or concrete the foundation may be prepared as for applying lime mortar for plastering, lathing the outside of the wooden frame, keeping the lathes or strips about one-quarter of an inch apart, taking care to wet the wood-work with my aqueous solution of gum copal. To apply these ingredients for such purposes it is necessary to use more of the solution than in making stone, as it will need to be of a pasty consistency, so as to be put on or spread with a hand-float or trowel; and after a suitable time it may be finely surfaced or finished and blocked to resemble stone in shade and hardness.

The aqueous solution of gum copal is made by first boiling soft or rain water, then adding sal or caustic soda or other alkaline substance in proportion to the amount of gum copal, and boiling the same until the gum copal is cut and dissolved. After this the gum will be held or remain in solution.

I am aware that an artificial stone composed of certain ingredients moistened by a solution of gum shellac is not new.

By experiments I have found that this shellac solution does not work well with American cements, the stone made therefrom sometimes cracking and crumbling. I have further found these objections are obviated by the use of the gum-copal solution.

Having thus fully described my invention, what I claim as new, and desire to secure by Letters Patent, is—

1. The combination of cement, sand, or other suitable mineral substances or material, and an aqueous solution of gum copal, to form a compound for making artificial stone and concrete, or for other similar purposes, substantially as herein set forth.

2. In the manufacture of artificial stone, concrete, or similar materials, the use of an aqueous solution of gum copal, substantially for the purposes herein set forth.

3. The process herein described of manufacturing or producing an aqueous solution of gum copal, substantially as and for the purposes herein set forth.

In testimony that I claim the foregoing I have hereunto set my hand this 14th day of March, 1872.

HENRY A. COOKE.

Witnesses:
B. F. WINSLOW,
GEO. W. GRINNELL.